United States Patent
Gloekler et al.

(10) Patent No.: US 7,212,122 B2
(45) Date of Patent: May 1, 2007

(54) METHODS AND APPARATUS OF MESHING AND HIERARCHY ESTABLISHMENT FOR TRACKING DEVICES

(75) Inventors: John S. Gloekler, Oakland, CA (US); John O'Sullivan, Hunters Hill (AU); Geoffrey J. Smith, Mt. Gravatt East (AU); Philip Ryan, Stanmore (AU)

(73) Assignee: G2 Microsystems Pty. Ltd., Haymarket (AU)

( * ) Notice: Subject to any disclaimer, the term of this patent is extended or adjusted under 35 U.S.C. 154(b) by 0 days.

(21) Appl. No.: 11/026,172

(22) Filed: Dec. 29, 2004

(65) Prior Publication Data
US 2005/0247775 A1    Nov. 10, 2005

Related U.S. Application Data

(60) Provisional application No. 60/533,329, filed on Dec. 30, 2003.

(51) Int. Cl.
*G08B 13/14* (2006.01)
(52) U.S. Cl. .................................. 340/572.1; 340/10.1
(58) Field of Classification Search ............. 340/572.1
See application file for complete search history.

(56) References Cited

U.S. PATENT DOCUMENTS

| | | | | |
|---|---|---|---|---|
| 5,740,366 | A | * | 4/1998 | Mahany et al. ............ 340/7.25 |
| 5,774,876 | A |   | 6/1998 | Woolley et al. |
| 5,804,810 | A | * | 9/1998 | Woolley et al. ............ 235/492 |
| 5,973,599 | A |   | 10/1999 | Nicholson et al. |
| 6,013,949 | A |   | 1/2000 | Tuttle |
| 6,027,027 | A |   | 2/2000 | Smithgall |
| 6,209,685 | B1 | * | 4/2001 | Zaharia et al. ............ 187/392 |
| 6,393,261 | B1 | * | 5/2002 | Lewis ........................ 455/103 |
| 6,400,272 | B1 |   | 6/2002 | Holtzman et al. |
| 6,504,503 | B1 |   | 1/2003 | Saint-Hilaire et al. |
| 6,509,828 | B2 |   | 1/2003 | Bolavage et al. |
| 6,539,281 | B2 |   | 3/2003 | Wan et al. |
| 6,614,351 | B2 |   | 9/2003 | Mann et al. |

(Continued)

OTHER PUBLICATIONS

U.S. Appl. No. 11/510,464 Muirhead, RFID Tracking System for Storing And Retrieving Data, filed Aug. 25, 2006.*

(Continued)

*Primary Examiner*—Daniel Wu
*Assistant Examiner*—Eric M. Blount
(74) *Attorney, Agent, or Firm*—Blakely Sokoloff Taylor & Zafman LLP (57) ABSTRACT

Devices, such as tracking devices, cooperate with one another to establish the routing necessary for a relay network in which a device having power-efficient and data-reliable communication with an access portal, operates to relay messages from devices which do not have an acceptable communication path to and/or from the access portal. In one aspect of the present invention, a plurality of devices synchronously determine whether an acceptable communication path can be established between themselves and one or more access portals by measuring the signal strength of an access portal beacon. In another aspect of the present invention, one or more devices, which have determined that an acceptable communication path can be established between themselves and an access portal, transmit information regarding their availability to relay messages on behalf of devices which have determined that an acceptable communication path cannot be established between themselves and an access portal.

20 Claims, 8 Drawing Sheets

U.S. PATENT DOCUMENTS

| | | |
|---|---|---|
| 6,624,752 B2 | 9/2003 | Klitsgaard et al. |
| 6,687,609 B2 | 2/2004 | Hsiao et al. |
| 6,700,533 B1 | 3/2004 | Werb et al. |
| 6,704,301 B2 * | 3/2004 | Chari et al. .................. 370/351 |
| 6,745,027 B2 | 6/2004 | Twitchell, Jr. |
| 6,804,578 B1 * | 10/2004 | Ghaffari ...................... 700/229 |
| 6,853,294 B1 | 2/2005 | Ramamurthy et al. |
| 6,859,761 B2 | 2/2005 | Bensky et al. |
| 6,859,831 B1 * | 2/2005 | Gelvin et al. .......... 340/539.19 |
| 6,892,054 B2 | 5/2005 | Belcher et al. |
| 6,933,849 B2 | 8/2005 | Sawyer |
| 6,934,540 B2 * | 8/2005 | Twitchell, Jr. ............ 455/422.1 |
| 6,943,678 B2 | 9/2005 | Muirhead |
| 6,958,677 B1 * | 10/2005 | Carter ........................ 340/10.1 |
| 6,961,541 B2 | 11/2005 | Overy et al. |
| 6,963,289 B2 | 11/2005 | Aljadeff et al. |
| 6,968,194 B2 | 11/2005 | Aljadeff et al. |
| 6,972,682 B2 * | 12/2005 | Lareau et al. ............. 340/568.1 |
| 6,978,118 B2 | 12/2005 | Vesikivi et al. |
| 7,023,356 B2 * | 4/2006 | Burkhardt et al. ..... 340/825.49 |
| 2002/0078363 A1 | 6/2002 | Hill et al. |
| 2003/0232598 A1 | 12/2003 | Aljadeff et al. |
| 2004/0024644 A1 | 2/2004 | Gui et al. |
| 2004/0024658 A1 | 2/2004 | Carbone et al. |
| 2004/0024660 A1 | 2/2004 | Ganesh et al. |
| 2004/0072577 A1 | 4/2004 | Myllymaki et al. |
| 2004/0100379 A1 | 5/2004 | Boman et al. |
| 2004/0203870 A1 | 10/2004 | Aljadeff et al. |
| 2004/0227630 A1 | 11/2004 | Shannon et al. |
| 2005/0128139 A1 | 6/2005 | Misikangas et al. |
| 2005/0131635 A1 | 6/2005 | Myllymaki et al. |
| 2005/0156711 A1 | 7/2005 | Aljadeff et al. |
| 2005/0181804 A1 | 8/2005 | Misikangas et al. |
| 2005/0197139 A1 | 9/2005 | Misikangas et al. |
| 2005/0207381 A1 | 9/2005 | Aljadeff et al. |
| 2005/0237184 A1 | 10/2005 | Muirhead |
| 2005/0241548 A1 | 11/2005 | Muirhead |
| 2005/0275530 A1 * | 12/2005 | Kates .................... 340/539.22 |
| 2006/0119471 A1 | 6/2006 | Rudolph et al. |

OTHER PUBLICATIONS

U.S. Appl. No. 11/102,221 Muirhead, Thermoformed Platform Having A Communications Device, filed Apr. 8, 2005.*
U.S. Appl. No. 60/117,373, filed Jan. 24, 2000, Muirhead.
U.S. Appl. No. 11/102,221, filed Apr. 8, 2005, Muirhead.
U.S. Appl. No. 11/510,464, filed Aug. 25, 2006, Muirhead.
Letter from NEXTREME, LLC. 2282 University Drive, Uniontown, Pennsylvania, 15401 USA., Scott Muirhead, to Mr. John Gloekler, 1"Re: U.S. Appl. No. 11/026,185", filed Sep. 2, 2006.
PCT Search Report, PCT/US04/43896, Dec. 30, 2004, G2 Microsystems PTY LTD.

* cited by examiner

METHODS AND APPARATUS OF MESHING AND HIERARCHY ESTABLISHMENT FOR TRACKING DEVICES

RELATED APPLICATIONS

This application claims the benefit of earlier filed provisional application 60/533,329, filed 30 Dec. 2003, and entitled "Item Tracking System And Device", the contents of which are incorporated herein by reference.

FIELD OF THE INVENTION

The invention relates generally to systems, devices, and methods for tracking items. In particular, the invention relates to a tracking devices that operate cooperatively to route messages suitable for tracking items throughout a supply chain.

BACKGROUND TO THE INVENTION

A major focus of companies today is the security and visibility of inventory throughout the supply chain. This is particularly important when management or processing of a high value asset is outsourced to another company. The use of Radio Frequency Identification (RFID) tags to facilitate item tacking is well known.

RFID tags are electronic devices that generally comprise a transponder and an integrated circuit programmed with unique identification information. In the context of a supply chain, RFID tags are located on items, and/or pallets of items, and may be used as a replacement for barcodes to identify items.

An RFID tag reader is used to read the unique data programmed on the RFID tag. An RFID tag reader is comprised of an antenna, transceiver, and a decoder, and can be configured either as a handheld unit, or as a fixed-mount device. The tag reader emits radio waves in ranges of anywhere from a few centimeters to about 40 meters, depending on its power output and the radio frequency used. When an RFID tag passes through the electromagnetic zone created by the tag reader, it detects the reader's activation signal. This electromagnetic zone energizes the RFID tag and enables the tag to transmit the data encoded on its integrated circuit. The reader decodes this data and the data is passed to a host computer for processing.

RFID tags are generally passive tags, as discussed above, in that they have no internal power source, and rely on an external source to provide power. In some instances, RFID tags may be active, in that they have an internal power source. Active RFID tags are more expensive and bulkier than passive RFID tags and, as such are generally not the preferred tracking device for item tracking.

Due to memory and processor limitations, the data stored on the RFID tag is generally little more than a unique identifier for the item. Hence, conventional systems offer little more than an electronic bar code that can be read from moderate distances.

A further disadvantage of conventional RFID tracking systems is the lack of synchronicity and integrity of the data across an entire supply chain. As different entities become involved in subsequent phases of the supply chain, the effective tracking of items from source to destination becomes complex and expensive. The integration of a company's backend systems with transport contractors and the like to enable auditing and tracking of the company's items throughout the supply chain is difficult and not scaleable.

For example, consider the situation where a transport contractor is used by a wide variety of companies to move freight. Each company has their own RFID system and the transport contractor has their own RFID system. While the transport company can read the data on the RFID tags for each company, the integration of the transport contractor's backend computer system with each company's is difficult and expensive and hence the companies have difficulty in accurately tracking their products throughout the supply chain.

Furthermore, RFID tags do not effectively solve the security requirements of governments and companies with high value assets. In order to meet these security requirements, and prevent theft and tampering using existing solutions it is required to install tag readers at every point between the manufacturer and consumer. This is clearly not a cost sensitive, scaleable or versatile solution to item tracking throughout the supply chain.

In another aspect of item tracking, it is desirable to communicate information from and/or to tracking devices associated with the items during their transit through the supply chain. Such tracking devices are typically disposed on the item, on the item packaging, or on a pallet upon which the items are disposed. Additionally, such items, and their associated tracking devices, may be collected into a storage area or container, and that storage area or container may provide one or more communication access portals through which inbound and outbound communication traffic must pass.

What is needed are methods and apparatus for allowing a plurality of low-power communication circuits having limited transmission range contained within the tracking devices to communicate through a communication access portal of a storage area or container.

SUMMARY OF THE INVENTION

Briefly, tracking devices cooperate with one another to establish the routing necessary for creating a relay network in which a tracking device having power-efficient and data-reliable communication with an access portal, operates to relay messages from one or more other tracking devices which do not have an acceptable communication path to and/or from the access portal.

In a further aspect of the present invention, a plurality of tracking devices synchronously determine whether an acceptable communication path can be established between themselves and an access portal by measuring the signal strength of an access portal beacon.

In a still further aspect of the present invention, one or more tracking devices, which have determined that an acceptable communication path can be established between themselves and an access portal, transmit information regarding their availability to relay messages on behalf of tracking devices which have determined than an acceptable communication path cannot be established between themselves and an access portal.

DETAILED DESCRIPTION

Various embodiments of the present invention provide devices, sometimes referred to as tags, that can determine whether power-efficient and data-reliable communication can be established between themselves and a communications access portal. Tags which can establish an acceptable communication path with the access portal notify tags than cannot, and also provide message relay services to those tags.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Terminology

As used herein, the expressions "communication access portal", "access portal", "communication portal", "wireless access point", "access point", and similar expressions, unless noted otherwise, refer to a communication facility through which tracking device in accordance with the present invention may transmit messages to, and receive messages from, remotely located entities. These communication facilities are generally actively powered circuits providing wireless, typically RF, message relay services between the tracking devices and remote entities.

As used herein, the expression "tracking device" refers to an active device that includes one or more integrated circuits, and which is capable of wireless, typically RF, communication. Tracking devices are described in much greater detail below. It is noted that because, in application, tracking devices are typically attached to an item, or package, or pallet, in a fashion similar to the way in which RFID tags, are attached, the tracking devices are also referred to herein as active tags, or more simply, when the context of the description permits, as tags.

The terms chip, integrated circuit (IC), microelectronic device, semiconductor device, and monolithic device, are often used interchangeably in the field of electronics. The present invention is applicable to all the above as they are generally understood in the field.

One embodiment of a tracking device in accordance with the present invention, includes an RFID communication module, the RFID communication module in communication with one or more RFID tags; a processing module in communication with the RFID communication module; and a wireless communication module in communication with the processing module and in operative communication with an internet; wherein, the RFID communication module receives data from one or more passive RFID tags and communicates that data to the processing module, the processing module interprets the data and forwards the data to the wireless communications module, the wireless communication module communicating the data over the Internet to a destination determined by the processing module.

One embodiment of a system in accordance with the present invention includes one or more tracking entities; one or more locations, each the location having: a communication portal in communication with the one or more tracking entities; one or more tracking devices, each tracking device having: (i) a wireless communication with the communication portal; (ii) a processing module in communication with the wireless communication module; and (iii) and RFID communication module in communication with the processing module; one or more passive RFID tags in communication with at least one tracking device; wherein the tracking device is able to read data from the one or more passive RFID tags and communicate the data to the one or more tracking devices.

Figure 1:
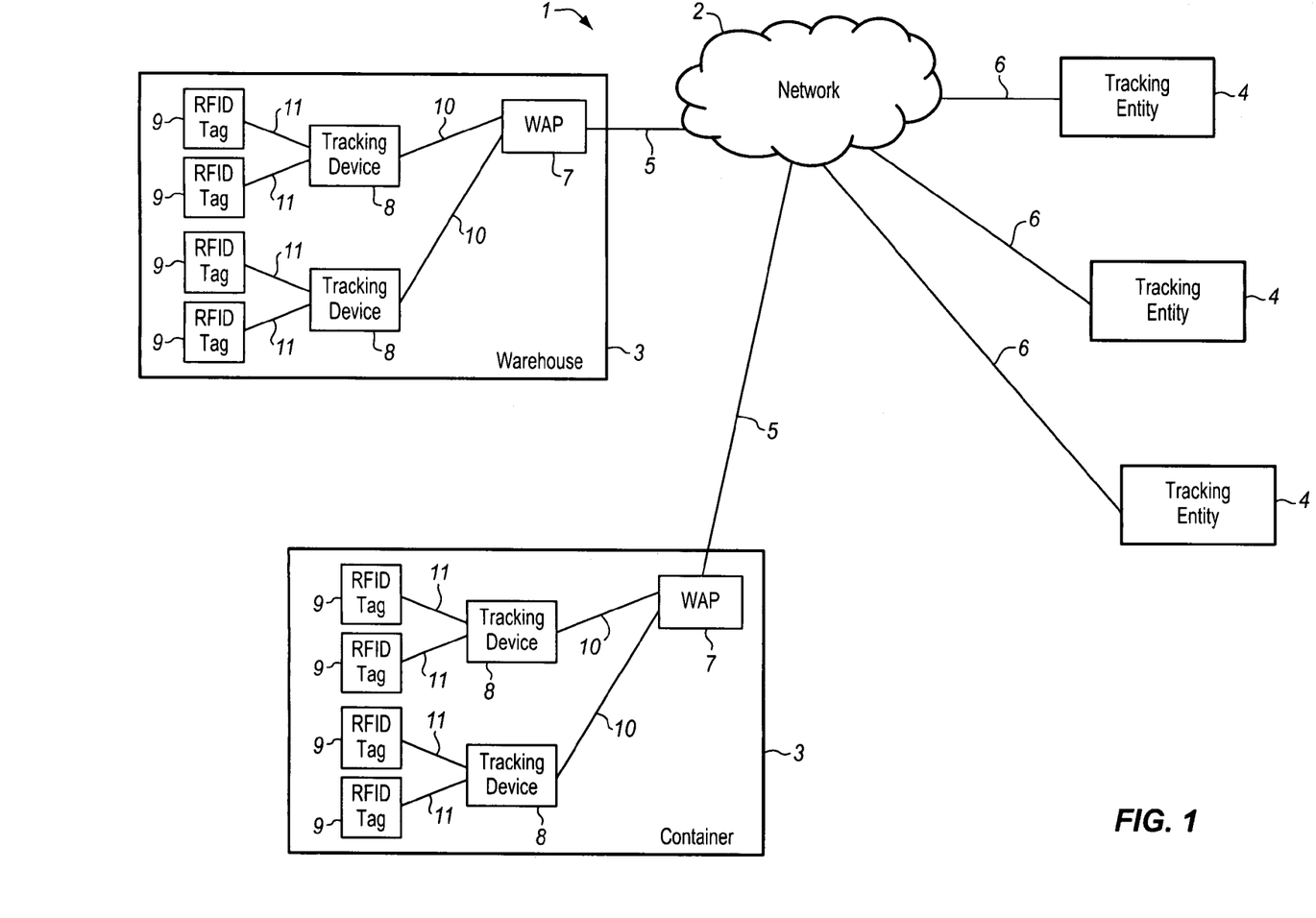
FIG. 1 shows an item tracking system according to an embodiment of the present invention.

FIG. 1 shows an item tracking system 1 according to a first embodiment of the present invention. Tracking system 1 has a network 2, a plurality of locations 3 and a plurality of tracking entities 4. Each location 3 is in communication with network 2 via a communication pathway 5. Similarly, each tracking entity 4 is in communication with network 2 via communication pathway 6.

Preferably, network 2 is the Internet although it will be appreciated that network 2 may be any form of communication network. As such, it will be appreciated that each of locations 3 are in operative communication with one or more of tracking entities 4. Similarly, each tracking entity 4 may be in operative communication with one or more locations 3. Preferably, tracking entity 4 is a supplier or distributor of items.

Location 3 has a communication portal 7 and a plurality of tracking devices 8 in communication with communication portal 7 via communication pathway 10. Location 3 further comprises a plurality of secondary tracking devices 9 in communication with primary tracking devices 8 via communication pathway 11.

Location 3 may be a storeroom, container on a ship, a truck or any entity that is used to store or move items throughout a supply chain.

In a first embodiment, location 3 is a warehouse used to store items in the supply chain. Preferably, secondary tracking devices 9 are passive RFID tags, as is known in the art, attached to items. These items may be cartons of goods stacked on a pallet, or individual high value items grouped together. Hence, secondary tracking devices 9 have encoded thereon a unique identifier that identifies the item upon which it is attached.

Tracking devices 8 are attached to a pallet upon which the items that have secondary tracking device 9 fitted thereto are located. Tracking device 8 is in communication with secondary tracking device 9 located on items on the pallet. Embodiments of tracking devices 8 are described in more detail below.

Each tracking device 8 is in communication with communication portal 7. Preferably, communication portal 7 is a wireless access point (WAP) and communication between each tracking device 8 and portal 7 is by means of wireless networks as is known in the art. Alternatively, other communication protocols may be implemented to facilitate communication between each tracking device 8 and communication portal 7.

Figure 2:
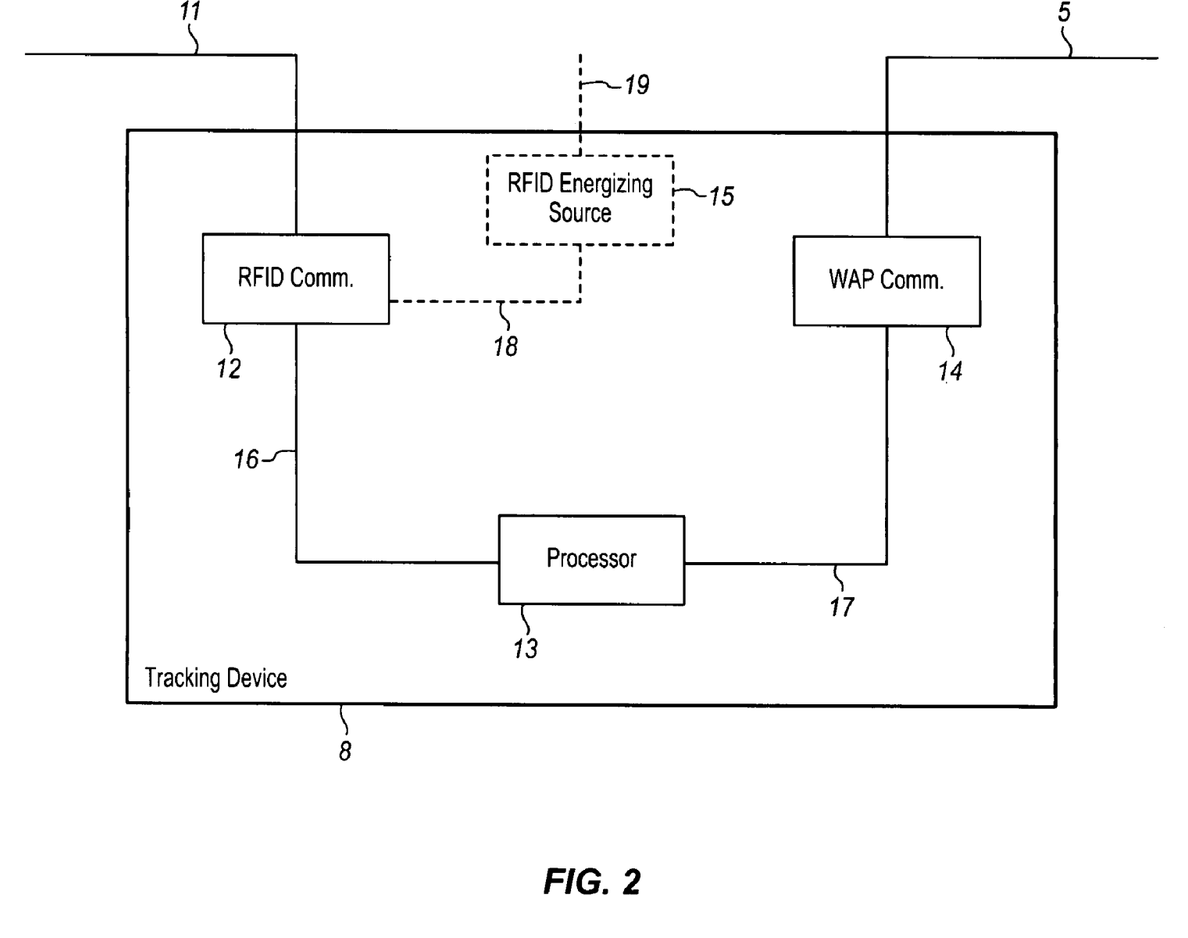
FIG. 2 shows a functional block diagram of an embodiment of a tracking device forming part of the item tracking system shown in FIG. 1.

FIG. 2. shows a functional block diagram of an embodiment of tracking device 8 forming part of tracking system 1. Tracking device 8 has a RFID communication module 12. Additionally, tracking device 8 has a wireless communication module 14 in communication via pathway 17 with processing module 13. Optionally, tracking device 8 may also have an RFID energizing source 15 for transmitting an energizing frequency upon pathway 19 to energize any secondary tracking device 9, in the form of passive RFID tags, within range.

Communication module 12 has a wireless transmitter and receiver and associated components to control these devices. Processing module 13 preferably comprises a programmable microchip controller and associated memory. Optionally, processing module 13 may comprise dedicated integrated circuits organized to perform desired functions. The implementation of tracking device 8 and its functional units will be described in more detail below.

In use, tracking system 1 tracks items throughout the supply chain. At predetermined intervals, secondary tracking devices 9 are activated by an external radio frequency source (not shown) located within location 3. Alternatively, the RFID energizing source 15 of each tracking device 8 may provide an energizing frequency to all secondary tracking devices 9 located upon items on the pallet on which each tracking device 8 is located.

Upon powering up, secondary tracking devices 9 transmit their unique identifier which is read by RFID communication module 12 of tracking device 8. As tracking devices 8 is located upon, for example, a pallet upon which items are located, each tracking device 8 receives a unique identifier from each secondary tracking device 9 located on an item stored on the pallet.

The information received from tracking devices 9 is then processed by processing module 13 on each respective tracking device 8. This information may be stored at processing module 13 or it may be communicated to wireless communication module 14 of tracking device 8.

Communication module 14 then packages this information into data packets that conform to the communication protocol that is being used between tracking device 8 and communication portal 7 and transmits this information to communication portal 7. It will be appreciated that the data communicated from tracking device 8 to communication portal 7 will have network address information present in the header of each data packet. As is known in the art, for example TCP/IP protocols, this information contains destination details for where the packets are to be delivered.

Communication portal 7 then forwards this information through the Internet 2 to one or more tracking entities 4. Tracking entities 4 have dedicated software to log this information, and to enable each tracking entity 4 to track items throughout the supply chain. In the event that items are missing, the tracking entity 4 can contact the proprietor of location 3 to notify them of this fact. Additionally, a log may be maintained so that if, for example, a particular location has a history of losing items, the tracking entity 4 can make an informed decision about which location to use for future transport/storage purposes.

In the case where information is stored at tracking device 8, processing module 13 validates certain information and communicates information to communication module 14. For example, in one embodiment of the present invention, when items are loaded onto the pallet, tracking device 8 stores the identification information from each secondary tracking device 9 attached to each item.

At regular intervals, tracking device 8 receives identification information from all tracking devices 9 located on items on the pallet. If processing module 13 of tracking device 8 detects that not all items are present on the pallet then an alert message is forwarded to one or more relevant tracking entities 4 using the process described above.

Optionally, tracking entities 4 may query tracking devices 8 for information. Hence, a tracking entity 4 may send a request over the Internet 2 requesting information or a particular action from a specific tracking device 8. The queried tracking device 8 then performs the action, or gathers the requested information, and then forwards this back to the relevant tracking entity 4.

Figure 3:
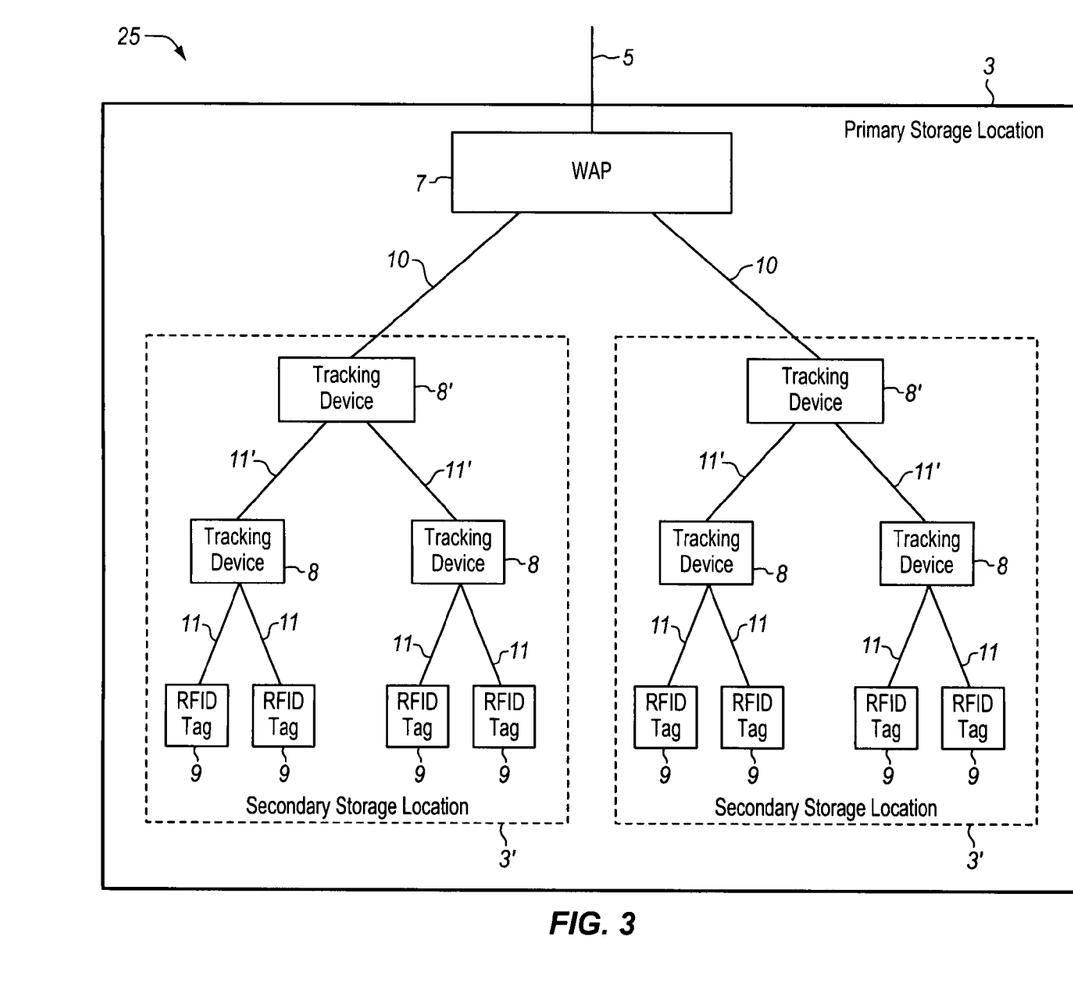
FIG. 3 shows an item tracking system according to a further embodiment of the present invention, wherein a hierarchical arrangement of tracking devices is used to communicate with the communications access portal.

FIG. 3 shows a partial view of item tracking system 25 as a further embodiment of the present invention. In this embodiment, location 3 has a plurality of secondary storage locations 3'. For example, location 3 may be a warehouse and location 3' may be shipping containers located in the warehouse.

As described above, tracking devices 8 are located on pallets and communicate the information from secondary tracking devices 9 located on items on the pallet. Tracking devices 8 then communicate this information to tracking device 8' located on a container in which the pallets are stored. This information is then communicated to communication portal 7 and to one or more tracking entities 4 via the Internet 2 as before. In this way, tracking entities 4 may determine not only what items are located on pallets, but what pallets and items are located within each container.

It will be appreciated that there may be many levels of hierarchy associated with the tracking system of the present invention.

Figure 4:
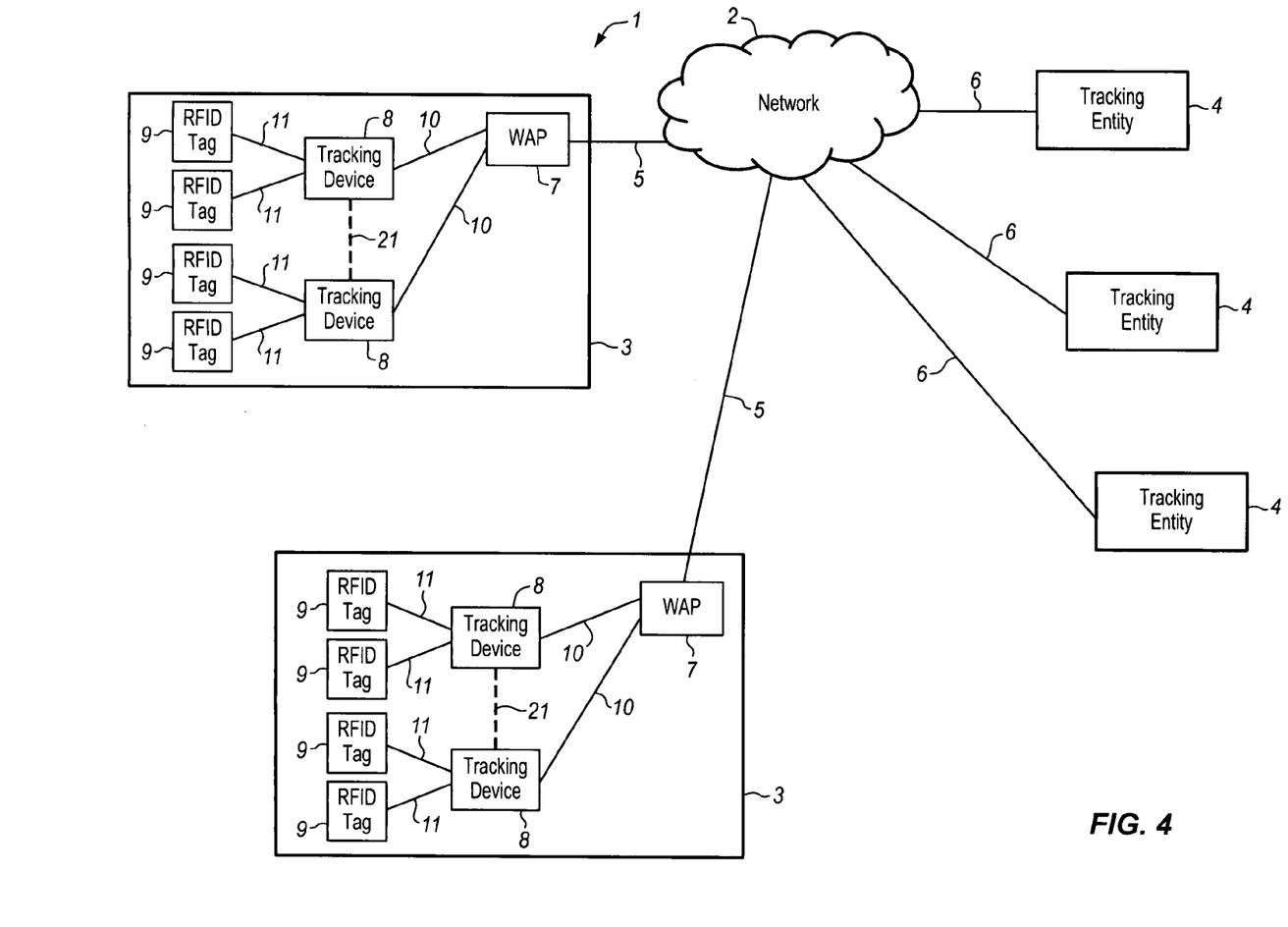
FIG. 4 shows an item tracking system according to a further embodiment of the present invention, wherein a peer-to-peer arrangement of tracking devices is used to communicate with the communications access portal.

FIG. 4 shows an item tracking system 1 according to a further embodiment of the present invention. In this embodiment, primary tracking devices 8 have a peer-to-peer communication pathway 21 for communication with each other. It will be appreciated that while only two tracking devices are shown in FIG. 4, peer-to-peer communication pathway 21 may exist between three or more tracking devices 8 forming a peer-to-peer network.

Any information that is sent from any tracking device 8 to tracking entity 4 passes through the peer-to-peer communication network 21 and is communicated by the closest tracking device 8 to communication portal 7. Communication along pathway 21 is facilitated by wireless communication module 14.

In this way, the power requirements of each tracking device 8 are reduced due to the lesser distance necessary to communicate information, as each tracking device 8 only requires enough transmission power to communicate with its nearest peer tracking device 8.

Figure 5:
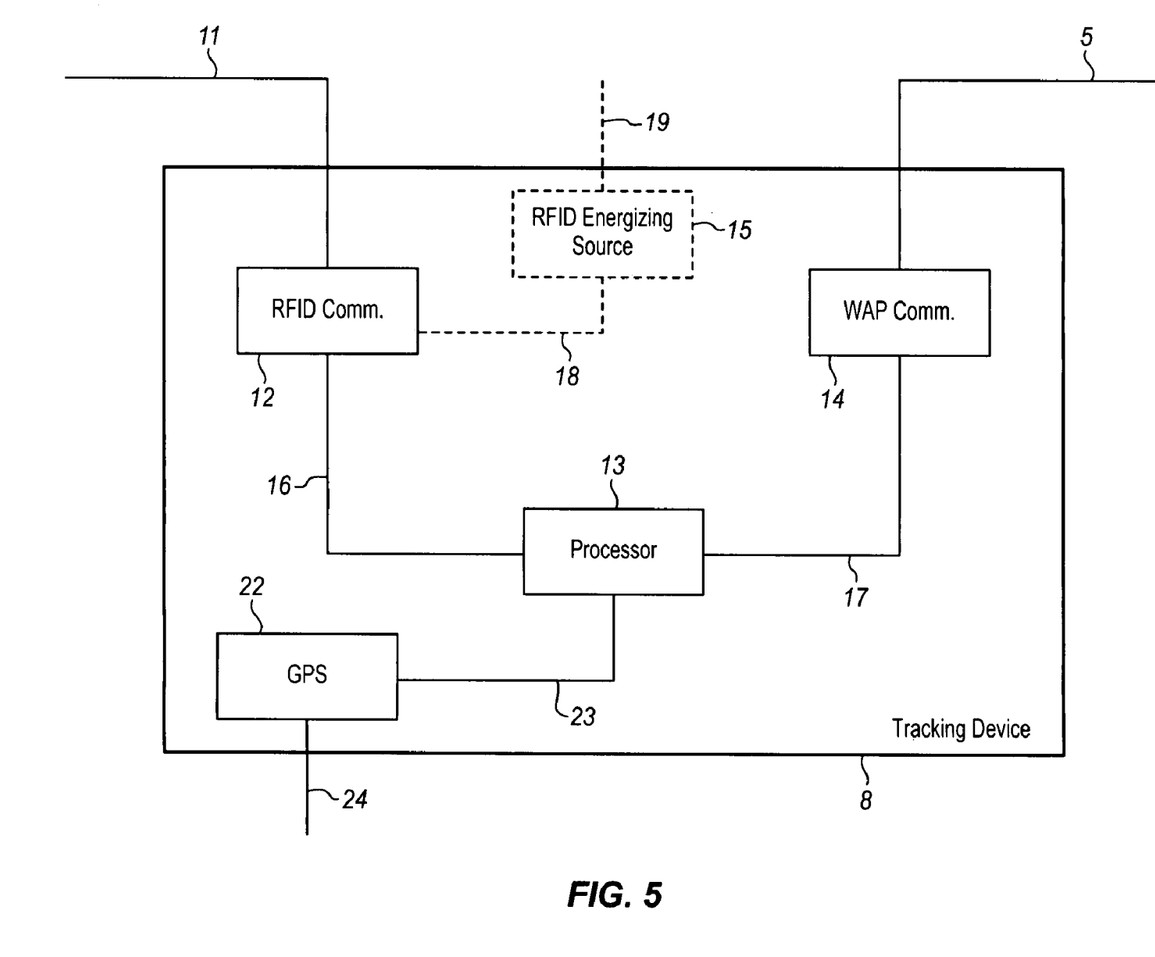
FIG. 5 shows a further embodiment of the tracking device shown in FIG. 2.

FIG. 5 shows a further embodiment of tracking device 8. In this embodiment, tracking device 8 has a Global Positioning System (GPS) module 22 in communication with processing module 13 via communication pathway 23. GPS module 22 implements known technology in order to determine the co-ordinates of tracking device 8. This information is communicated to processing module 12 for processing.

Optionally, GPS module 22 implements advanced signal processing correlation techniques to overcome the significant drop in GPS signal levels when indoors and hence provides for accurate position information to be determined when tracking device 8 is indoors. This technique has been used in Radio Astronomy applications and includes advanced correlation processing to enable GPS module 22 to extract tiny signal levels from periodic signals generated in space.

The embodiment of tracking device 8 shown in FIG. 5 has the advantage that at all times one or more tracking entities 4 can locate the precise coordinates of each tracking device 8. Preferably, tracking device 8 may send alert messages to a tracking entity 4 when the tracking device is located outside of the bounds of a pre-determined coordinate area.

For example, when tracking device 8 is located on a pallet being stored within a warehouse, the coordinates of the interior of the warehouse are programmed within processing module 13 of tracking device 8. This may be done prior to tracking device 8 being fitted to the pallet or may be done remotely by tracking entity 4 via the communication pathways described above. GPS module 22 determines the position of tracking device 8 at predetermined intervals and communicates this information to processing module 13. When processing module 13 receives position data from GPS module 22 that indicates that tracking device 8 has left the predetermined boundaries of the warehouse this fact is reported to one or more tracking entities 4 as indicated above.

Optionally, all GPS data collected by GPS module 22 may be communicated to tracking entity 4 for processing. In this case, software located at tracking entity 4 interprets this information and determines whether tracking device 8 is outside of a pre-determined location for that point in time. Alternatively, tracking device 8 sends its current position based on a request received from tracking entity 4.

Figure 6:
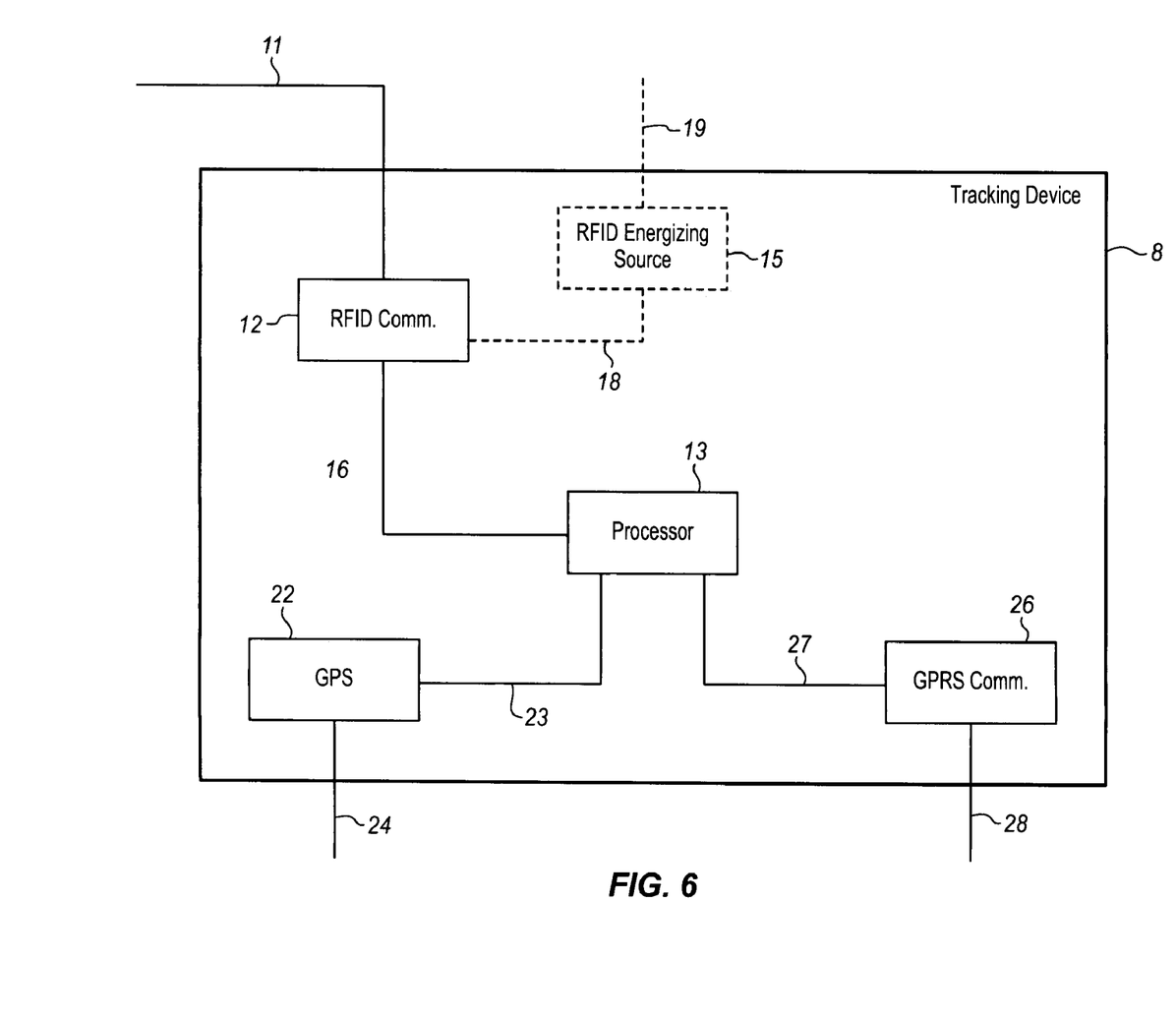
FIG. 6 shows a further embodiment of the tracking device shown in FIG. 2.

FIG. 6 shows a further embodiment of tracking device 8. In this embodiment, tracking device 8 no longer has a wireless communication module 14. This embodiment of tracking device 8 has a cellular communication module 26 in communication with processing module 13 via data pathway 27. Cellular communication module 26 is in communication with a cellular telecommunications network. In this embodiment all data is communicated indirectly to tracking entities 4 via the communication network. Preferably, the GPRS telecommunications protocol is used to facilitate this communication, although other protocols, such as, but not limited to SMS or the like, may be used.

It will be apparent that tracking entities 4 will have an interface to the telecommunications network in order to receive and send communication from and to tracking devices 8.

This embodiment of the present invention is especially advantageous for mobile tracking applications. For example, tracking device 8 may be located on a pallet on a truck and has the capability to communicate with one or more tracking entities 4 via cellular communication module 26 without the need for a physical communication link. Furthermore, GPS data can be communicated to the tracking entity to ensure that the precise location of tracking device 8, and consequently the secondary tracking devices that are in communication with tracking device 8, can be communicated to one or more tracking entities 4. In this way, for example, tracking entity 4 can be notified when a truck deviates from a predetermined route. In this example, the route of the truck is preprogrammed into processing module 13 of each tracking device 8, and tracking device 8 can notify one or more tracking entities 4 when the truck deviates from this route.

It will be appreciated that variations of tracking device 8 shown in FIG. 2, FIG. 5, and FIG. 6 fall within the scope of the present invention. For example, tracking device 8 shown in FIG. 6 may have a wireless communication module 14 instead of cellular communication module 26, among other variations.

The item tracking system and device of the present invention is not limited to being applied to supply chain management uses. For example, the use of tracking device 8 shown in FIG. 6 may be used in parenting applications to safeguard children. For example, tracking device 8 shown in FIG. 6 may have a wireless communication module 13. A tracking device 8 is fitted to a parent and a child with each tracking device being in communication with each other. The tracking device 8 fitted to the parent can continually poll the child tracking device and query its GPS location. The parent's tracking device is pre-programmed to alert the parent, either by audio means, visual means or tactile means, when the child's tracking device is located more than a certain distance from the parent's tracking device. Hence, the parent can keep track of a young child.

Other applications may also exist, such as a child's tracking device notifying a parent's tracking device when the child enters a predetermined location, such as a pool area or the like.

A significant advantage offered by the tracking system and device of the present invention is the feature that passive RFID tag information can be communicated over the Internet to a relevant tracking authority. In this way, data is synchronized between tracking authorities and a truly transparent supply chain is provided.

Furthermore, the use of GPS on the tracking devices allows high valued assets to be tracked throughout the supply chain with their exact location known at all times. This allows for the possibility that the tracking device can be pre-programmed to respond to certain conditions (e.g., outside a predetermined area) and notify a tracking entity 4 of these conditions.

Additionally, the provision of a tracking device that has the capacity to alert a party, based at least in part on alert conditions programmed into a chip of the tracking device is a significant advantage over conventional tracking devices. Furthermore, a tracking device that has the capacity to comply with a wide variety of communication protocols allows for the delivery of a flexible item tracking device and system.

Referring again to FIGS. 3 and 4, it can be seen that an intermediate tracking device is disposed in the communication pathway between the access portal and a second tracking device. Although FIG. 3 illustrates a hierarchical arrangement while FIG. 4 illustrates a peer-to-peer arrangement, it will be appreciated that the various embodiments of the present invention include mechanisms for determining which tracking devices communicate directly with an access portal, and which require message relay services. Generally, methods for determining which tracking devices communicate directly with an access portal include one or more considerations such as, but not limited to, the strength of a signal received from an access portal beacon, the modulation scheme to be used in the communications between the tracking device and the access portal, the data rate to be achieved, the allowable bit error rate, whether error detection and correction codes are to be used, the transmission power required to transfer data between the tracking device and the access portal within acceptable data rate and error rate constraints, the current charge level of the tracking device's battery, and the overhead consumed by higher level network protocols for ensuring accuracy of the communications.

Tags that include a variety of active circuitry consume power, thus draining their respective batteries. It is well-known that to conserve power, circuitry that is not required to be in operation can be shut down so as to achieve a conservation of power. For a tag whose radio circuitry has been shut down, wireless communications are not possible. From time to time, it is desirable to wake up a tag wherein the radio circuitry has been shut down, so that the tag may engage in wireless communication, i.e., transmitting data and receiving data.

In various embodiments of the present invention, it is desirable to synchronously enable one or more tags. In many embodiments, the tags maintain an accurate clock by means of, for example, a Real Time Clock (RTC), time determined from a GPS reception, or an 802.11 communication. As a consequence of maintaining an accurate clock within each of a plurality of tags, those tags will have substantially the same time, i.e., the same time±a small error. In this way, the tags have a common time reference and can therefore engage in time synchronous activities.

In one embodiment, by programmed agreement, the tags wake up at specific times, e.g., every hour on the hour, every 5 minutes on the minute, and so on. By waking up, it is meant that at least a portion of the circuitry that was previously in a powered down state is powered up so as to be operational. Once awakened, the tags stay awake for T seconds. This period may be referred to as mesh time.

Typically, tags have a normal, or pre-determined, time programmed into them specifying when data communications are to occur. It is noted however, that alternative embodiments may provide the circuitry and/or software required o receive and process commands which effect a re-programming of this time. If a tag has successfully communicated its data then it may wake up in mesh time for one of two reasons: (1) to provide mesh/bridge services to other tags; or (2) to receive data updates (or to be told to stay on so as to receive data updates). On the other hand, tags that have not been able to send data at their pre-determined communication times may wake up at mesh time for one of three reasons: (1) to use mesh/bridge tag(s) to get a route to an access portal; (2) to provide mesh/bridge services to other tags; or (3) to receive data updates. It is noted that tags that are trying to conserve their own power, because of a low power condition, have to wake up but are allowed to opt out of providing mesh services to other tags. By opting out of the mesh/bridge services, that particular device will be able to avoid the power draining operations of receiving and forwarding messages for other tags.

It will be appreciated that one consideration in such an arrangement is to design the 802.11 reception so that the power required during the period T is an affordable energy drain.

An illustrative embodiment of the present invention is described in the context of a "container canyon". Assume that a container canyon is a two-dimensional (2D) array of containers stacked five high, and assume that each container has a tag disposed thereon. Further assume that most tags on the top level of containers can see an access portal (i.e., transmit to and receive from an access portal within pre-determined bit error rates); some tags on the second highest containers can see an access portal; and most tags on lower levels of containers cannot see an access portal. In this illustrative embodiment, those tags that cannot see an access portal require meshing, or bridging, assistance to facilitate communications to and from the access portal. This assistance may also be referred to as relaying. In other words, tags that are essentially out of communication range with the access portal require the assistance of one or more tags, which are disposed between the out-of-range tag and the access portal, to relay messages between the out-of-range tag and the access portal.

As noted above, for a tag to see an access portal, the tag should be able to transmit to, and receive from, the access portal within pre-determined bit error rates. It is noted that if a tag includes the functionality required to perform error detection and correction, that the pre-determined bit error rate mentioned above, becomes the error rate after correction. Similarly, if the tag includes the functionality required to insert error correction codes in its transmissions, and the access portal has the ability to perform error correction based on these codes, then the tag may be able to transmit at lower power levels and still achieve communication with the access portal within pre-determined bit error rates.

It will be appreciated that whether an acceptable communication path between a tag and an access portal can be established may be determined in a variety of alternative ways, For example, an affirmative determination may be made simply on the basis of the received signal strength at the tag of the access portal's beacon. Alternatively, such a decision may be made by the tag based upon a determination of the transmit power required to reach the access portal and the power level of the tag's battery. It will be appreciated by those skilled in the art and having the benefit of this disclosure, that data rates, modulation schemes, and transmit power are related, and various trade-offs are available for implementations of the present invention in which, for example, a lower data and lower transmission power are chosen for communication in instances where a tag's battery power is below a pre-determined threshold. In further alternative embodiments of the present invention, a tag may choose the data rate and/or modulation scheme that provides for the lowest overall power drain.

In still further alternative embodiments, the tag may choose to transmit at a relatively lower power and lower data rate if the amount of data it has to transmit is less than a pre-determined amount, and may further choose to transmit at a relatively higher power and higher data rate if the amount of data it has to transmit is greater than a pre-determined amount. It is noted that there may an arbitrary number of power and data rate combinations depending on the amount of data to be transmitted within a given time period. In this way, the lowest power operation that is permissible to achieve a particular data transfer may be used by a transmitting tag.

It is noted that in some circumstances, an out-of-range tag may actually be physically closer to the access portal than is a tag which provides relay services to the out-of-range tag. For example, a tag with a more powerful transmitter and/or a more sensitive receiver may be able to communicate with the access portal within the pre-determined bit error rate even though it is disposed at a greater distance from the access portal than the tag to which it provides message relay services. For purposes of this description, when a tag that provides message relay services is referred to as being between a tag and an access portal, it is meant that the relaying tag is intermediate the access portal and the out-of-range tag in the communication path therebetween, regardless of the physical location of the tags and portals.

An illustrative method in accordance with the present invention, and described in the context of the container canyon set forth above, includes waking up the tags, performing a meshing operation, and performing the required data transfers. It will be appreciated that the expression "data transfers" in this context may include communication from an out-of-range tag to the access portal via one or more relaying tags, as well as communication from the access portal to the out-of-range tag through one or more relaying tags.

As described in greater detail below, the meshing operation is performed to establish the information needed for routing, or relaying, messages from one or more tags, which cannot communicate successfully with an access portal, through one or more other tags in order to reach an access portal. The establishment of this routing information may be referred to as "route setup". In summary, tags wake up at a predetermined time, for example, 15 minutes past the hour; this is referred to as mesh time, which lasts for a certain period of time, T, where T is fairly short, for example 3 seconds; mesh time can be synchronized because the tags have obtained synchronized time from one or more sources, such as but not limited to, GPS signals, 802.11 ATP, and RTC clocks.

In this illustrative embodiment, all tags wake up during mesh time. By being "awake" it is meant that the tags are powered up to the extent necessary to perform at least the route setup operations. During route setup, all the powered up tags listen for access portal beacons. The tags that can hear (i.e., successfully communicate with) an access portal beacon, recognize this ability and subsequently put out an 802.11 packet that provides this information to other tags. Such packets may include the information essentially stating "I am tag with MAC address xxxx and I am 1 hop away from an access portal". A tag that is one hop from an access portal is referred to herein as a Level 1 tag. Tags that cannot hear an access portal beacon take no action at this point with respect to the route setup operation. Tags that are not themselves Level 1 tags but can hear a Level 1 tag's broadcast put out an 802.11 packet to transmit this fact. Such a packet may include the information essentially stating "I am a tag with MAC address xxxx and I am 2 hops away from an access portal". Such a tag is referred to herein as a Level 2 tag. These steps can be repeated multiple times to as many hop levels as are required, or otherwise deemed necessary.

It will be appreciated that a certain amount of memory is required, in at least the tags that are two or more hops away from an access portal, in order to store the routing information that is needed for that tag to engage in communications via the access portal.

Once the routing information has been established, various data transfers can take place. In one embodiment, a tag that needs to send data, selects a tag that has broadcast the lowest hop and transmits its information to that tag. The selected destination tag receives the information and rebroadcasts it to the access portal. Alternatively, the tag that has data to send, may specify a more complex routing and encapsulate that routing information in any suitable format. In one embodiment, a tag that has data to send, transmits its data to a tag that simply has a lower hop number. It will be appreciated that in such a case, the data packet must be forwarded on until it reaches a tag that is only one hop away from the access portal.

In an alternative embodiment, power levels during access portal route setup broadcasts are detected, and the power received information is subsequently used to decide which intermediate tag is closest and hence which intermediate tag an initiating tag can reach with the lowest possible transmit power. It will be appreciated that a number of tradeoffs exist, and taking these tradeoffs into consideration produces a number of alternative implementations of the present invention. For example, with respect to return packets, the intermediate tag may store the route information in order to pass back any response data; or the data packet may be augmented with additional routing information. In this illustrative embodiment, all tags go to sleep after mesh time is over. Tags that have sent data and tags that have 'assisted' wake up again in a short while (response mesh time) in order to accept packets that have queued at the access portal.

Figure 7:
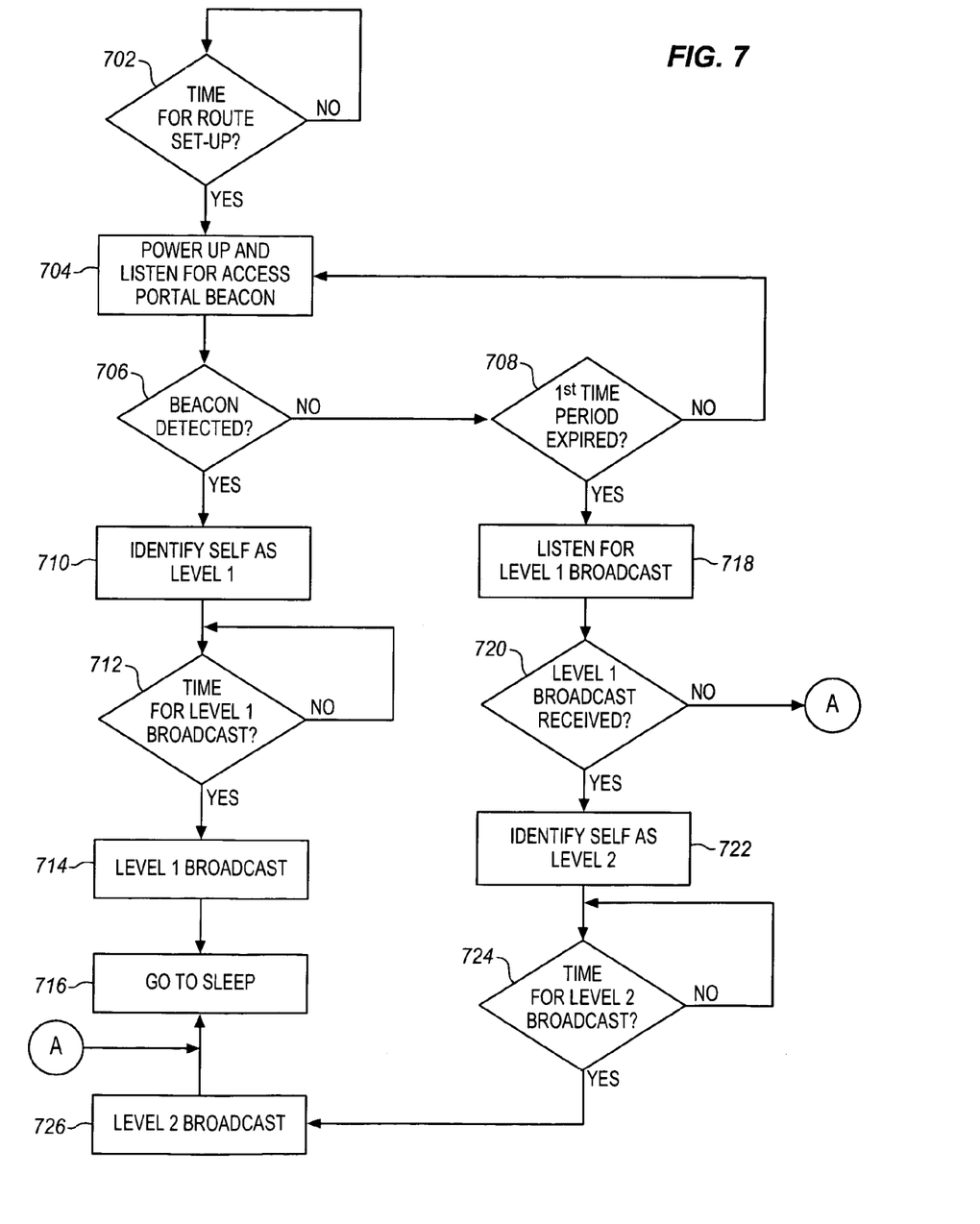
FIG. 7 is a flow chart illustrating a wake-up and meshing operation in which a routing set-up operation is performed.

Referring to FIG. 7 an illustrative method 700 is described that includes a wake-up and meshing operation for a routing set-up that is performed by a tracking device, or tag. Within a tag that is in a sleep, i.e., power-down, state, in accordance with the present invention, a determination is made 702 as to whether it is time to perform a route set-up operation. As noted above this operation may be performed synchronously with a plurality of other tags which share a common time reference. If the determination of 702 is negative, then the tag may continue in a state in which it waits for the appropriate pre-determined time at which to wake up for the route set-up operation. If the determination of 702 is affirmative, then the tag wakes-up and listens 704 for an access portal beacon.

A determination is made 706 as to whether an access portal beacon is detected. Typically, this determination is more than simply the detection of a particular signal, and rather includes the determination that an acceptable communication pathway can be established between the access portal and the tag. For example, if an access portal beacon signal having a low signal strength is detected, then it may be determined that an unacceptably high error rate would occur in data received from the access portal. In a further example, if the received signal strength is low, indicating that a certain transmit power would be required to reach the access portal for the tag, but the tag's battery power is also below some pre-determined threshold level and the required high level of transmit power cannot be provided, then the determination is that an acceptable communication pathway cannot be achieved. If the determination of 706 is negative, then a determination is made 708 as to whether a first time period has expired. If the determination of 708 is negative then method 700 returns to step 704 and continues to listen for an access portal beacon. if the determination of 706 is affirmative then the tag identifies itself as a Level 1 tag and records 710 the fact that it has successfully received the access portal beacon. A determination is made 712 as to whether it is time for the tag to broadcast its status as a Level 1 tag. If the determination of 712 is negative, then the tag continues to wait until it is time to make such a broadcast. If the determination of 712 is affirmative then the tag broadcasts 714 its status as a Level 1 tag. The tag then goes to sleep, i.e., enters a low-power state 716.

Still referring to FIG. 7, if the determination of 708 is affirmative, then the tag listens for a Level 1 broadcast. A determination is made 720 as to whether a Level 1 broadcast has been received. If the determination of 720 is negative, then the tag goes to sleep 716. However, if the determination of 720 is affirmative, then the tag identifies itself as a Level 2 tag and records 722 the fact that it has successfully received the Level 1 broadcast. A determination is made 724 as to whether it is time for the tag to broadcast its status as a Level 2 tag. If the determination of 724 is negative, then the tag waits until it is time to make the Level 2 broadcast. If the determination of 724 is affirmative, then the tag broadcasts its status as a Level 2 tag. In this illustrative embodiment, the tag then goes to sleep 716.

Figure 8:
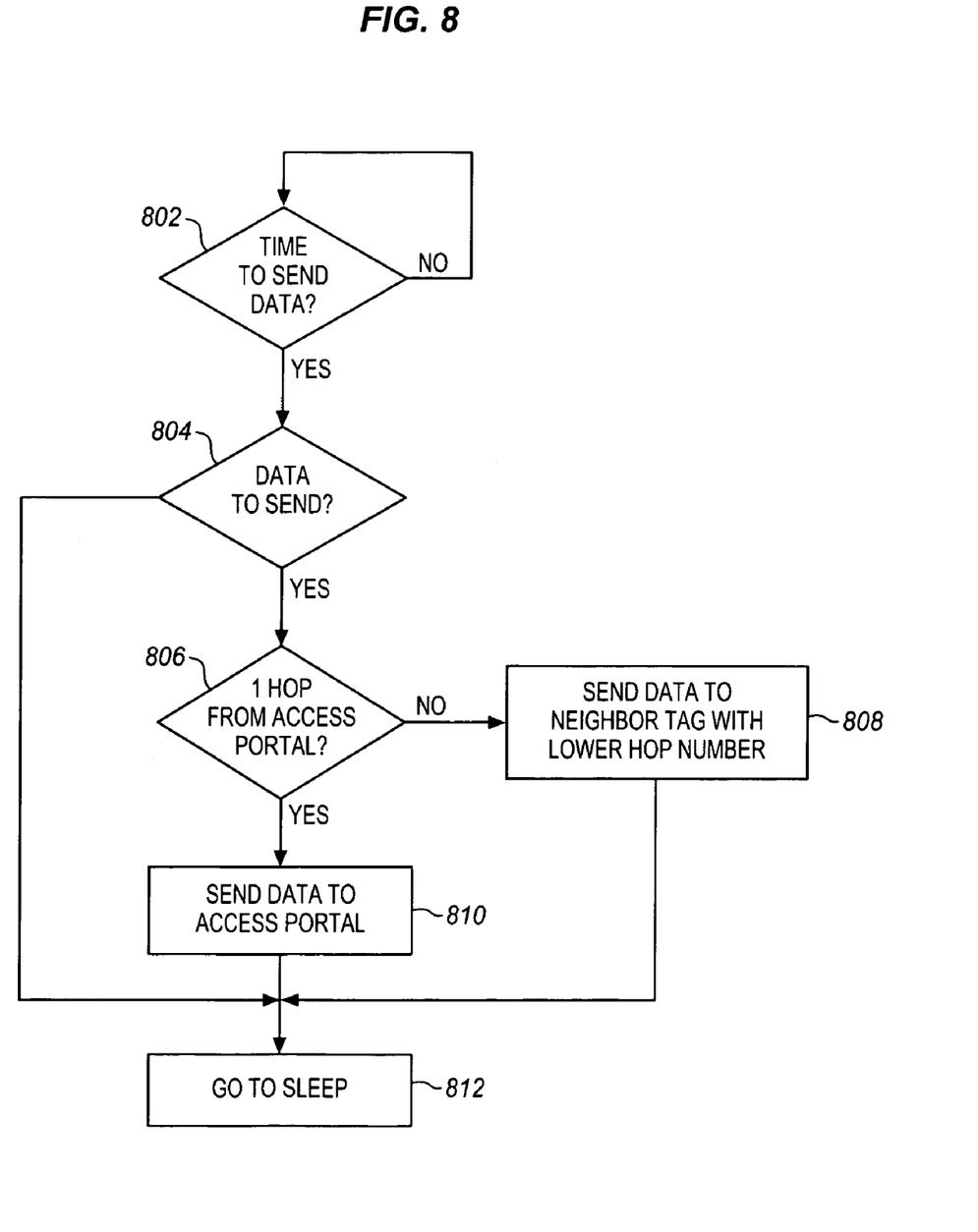
FIG. 8 is a flow chart illustrating a wake-up and data transmission operation in accordance with the routing set-up obtained by the wake-up and meshing operation.

Referring to FIG. 8 an illustrative method 800 is described that includes a wake-up and data transmission operation in accordance with the routing set-up obtained by the wake-up and meshing operation (of FIG. 7). A determination is made 802 as to whether it is time to transmit data. If the determination of 802 is negative, then the tag continues to wait until it is time to transmit data. If the determination of 802 is affirmative, then a determination is made 804 as to whether there is data for this tag to transmit. It is noted that the data to be sent from this tag may be locally originated data, or data previously sent to this tag for forwarding by a tag that is a greater number of hops away from the access portal. If the determination of 804 is negative, then the tag goes to sleep 812. If the determination of 804 is affirmative, then a determination is made 806 as to whether direct communication with an access portal is possible, i.e., whether this is a Level 1 tag. If the determination of 806 is negative, then the data is sent 808 to a neighboring tag with a lower hop number. In other words, if this tag is a Level 2 tag, it will send its data to a Level 1 tag to be relayed to the access portal. The tag then goes to sleep 812. It is noted that there is no particular limit on the number of levels that may participate the message relay scheme described herein. It will be appreciated that tags will require sufficient memory to store messages for forwarding.

Still referring to FIG. 8, if the determination of 806 is affirmative, then the tag sends its data 810 directly to the access portal. The tag then goes to sleep 812.

In alternative embodiments, the tag, prior to determining whether there is data to transmit, determines whether the battery charge is above or below a pre-determined threshold value. If the available battery charge is below the pre-determined threshold then the tag goes into a low power state rather than engage in data transmission operations. In this way, the tag may preserve its battery power for other duties that it may be required to perform.

In still other embodiments, a series of pre-determined battery charge thresholds are maintained in the tag, and when the charge level drops below a particular threshold, then specific actions may be taken. For example, prior to the battery charge level dropping to the point at which the tag refuses to conduct transmission operations, the tag recognizes at a higher charge level that it must notify other tags that it will cease transmission operations at a definite point in the future. This allows time for a new routing set-up operation to be performed, in which the tag with the diminishing battery power reserve does not become a part of the message relay network.

In an alternative embodiment, the tags that are not needed to support a mesh go to sleep, i.e., enter a state of lower power consumption, earlier during mesh time. Some additional computational resources are used to make the tags aware of whether they are required to operate for the purpose of relaying a packet for another tag. One means for the tags to gain this awareness includes, during the route setup sequence, broadcasting this fact by the tags that will want to send data via the mesh (i.e., tags that are more than one hop from an access portal). Typically, such a broadcast would be made without transmitting the data which is queued to be sent. In this way most tags will quickly know whether other tags need them to act as an intermediate tag. If a particular tag is not needed as an intermediate tag for relaying, or forwarding, data packets, then that tag may go to sleep.

In some embodiments of the present invention, tags do not have to participate in mesh time. More particularly, tags with a low battery state may choose to opt out of supporting mesh time. In various embodiments of the present invention, a tag that opts out of supporting mesh time may record the fact that it did not participate in one or more mesh times. Any suitable format of recordation may be used. In one illustrative embodiment, a timestamp may be recorded in a table in memory, the entries in the table being made whenever the tag opts out of a mesh time. In further alternative embodiments, even the recordation of opting out may be suspended if the amount of charge left in the tag's battery is below a predetermined threshold. It will be appreciated that the tag may also record the time at, or after which, it will no longer record this, or other events.

It will be appreciated that in some embodiments of the present invention the powered down state represents a condition in which the voltage potential between a power rail and a ground rail is brought to zero. In other embodiments, a powered down state represents a condition in which a switch, such as a transistor, disposed in the pathway between a power rail and ground rail, and which pathway includes circuitry to be powered down, is opened so that the path between the power and ground nodes is disrupted and consequently no current may flow. In other embodiments, a powered down state represents a condition in which the frequency, or operating speed, of the circuitry is reduced. In still other embodiments, a powered down state represents a condition in which the power supply voltage of the circuitry is reduced. In still further embodiments, powered down state represents a condition in which a substrate bias voltage is applied to one or more regions of an integrated circuit, such that MOSFET transistor threshold voltages are increased, and leakage currents are reduced. It will be appreciated by those skilled in the art and having the benefit of this disclosure that a powered down state may be implemented in many ways, but in each case is designed to reduce the steady-state power consumption, typically at the cost of reducing the functionality or performance level of the circuits involved.

Conclusion

Various illustrative embodiments of the present invention, including methods and apparatus for allowing a plurality of tracking devices to cooperate for at least the purpose of communicating with a remote communication facility, have been described.

It will be appreciated that the systems, methods, devices, and apparatus of the present invention may be applied to a wide variety of applications other than item tracking in a supply chain.

An advantage of some embodiments of the present invention is that wakeup operations are provided for by using 802.11 reception, while remaining under predetermined power consumption constraints. By using the hardware for wireless communication already present in a tag to support 802.11, the need for including an additional RF module is obviated. This, in turn, saves area on an integrated circuit thereby reducing cost, saves power consumption, thereby increasing battery life, and also saves design time, thereby reducing both cost and time-to-market.

It is to be understood that the present invention is not limited to the embodiments described above, but may encompass any and all embodiments within the scope of the subjoined Claims and their equivalents.

What is claimed is:

1. A method of communicating information among a plurality of tags, comprising:
   a) determining, within a first one of the plurality of tags, whether a pre-determined time for powering up and engaging in a route set-up operation has arrived;
   b) powering up and listening for an access portal beacon if the determination of (a) is affirmative;

c) determining whether the access portal beacon has been detected by receiving a signal, and determining whether the strength of the received signal is above a pre-determined threshold;

d) identifying, if the determination of (c) is affirmative, the tag as a level 1 tag, and recording the level number;

e) determining whether a pre-determined time for broadcasting a level 1 announcement has arrived;

f) broadcasting, if the determination of (c) and (e) is affirmative, a level 1 announcement;

g) determining, if the determination of (c) is negative, whether a first time period has expired;

h) listening, if the determination of (g) is affirmative for the broadcast of a level 1 announcement;

i) determining a charge level of a battery that supplies power to the first tag; and j) determining the transmit vower level required to transmit data to the access portal.

2. The method of claim 1, further comprising:

k) determining whether the broadcast of a level 1 announcement has been. received;

l) identifying, if the determination of (k) is affirmative, the tag as a level 2 tag, and recording the level number.

3. The method of claim 2, further comprising:

m) determining, subsequent to (l), whether a pre-determined time for broadcasting a level 2 announcement has arrived; and n) broadcasting, if the determination of (m) is affirmative, a level 2 announcement.

4. The method of claim 1, wherein determining the required transmit power level comprises determining a required data rate and bit error rate.

5. The method of claim 1, further comprising, subsequent to broadcasting a level 1 announcement, entering a low power state.

6. The method of claim 3, further comprising, subsequent to broadcasting a level 2 announcement, entering a low power state.

7. The method of claim 3, wherein the first tag comprises an RFID communication module, a processor module coupled to the RFID communication module, and a wireless communication module coupled to the processor module.

8. A method comprising:

listening for an access portal beacon at a tag;

identifying the tag by the tag as a level 1 tag, if the access portal beacon is detected;

recording the level number at the tag as level 1, if the tag is identified as a level 1 tag;

broadcasting a level 1 announcement from the tag, if the tag is identified as a level 1 tag;

listening for a broadcast of a level 1 announcement from a neighbor tag, if the tag is not identified as a level 1 tag.

9. The method of claim 8, further comprising:

determining whether the broadcast of a level 1 announcement from a neighbor tag has been received;

identifying the tag by the tag as a level 2 tag, if the access portal beacon is not received and a level 1 announcement is received.

10. The method of claim 8, wherein detecting the access portal beacon comprises:

receiving a signal; and determining whether the strength of the received signal is above a pre-determined threshold.

11. The method of claim 10, further comprising:

determining a charge level of a battery of the tag; and determining the transmit power level required to transmit data to the access portal based on the strength of the received signal;

comparing the required transmit power level to the battery charge level; and determining whether to identify the tag as a Level 1 tag based on the comparing.

12. The method of claim 9, further comprising:

determining whether the broadcast of a level 2 announcement from a neighbor tag has been received;

identifying the tag by the tag as a level 3 tag, if the access portal beacon is not received, a level 1 announcement is not received, and a level 2 announcement is received.

13. The method of claim 12, further comprising:

determining whether the broadcast of a level 3 announcement from a neighbor tag has been received;

identifying the tag by the tag as a level 4 tag, if the access portal beacon is not received, a level 1 announcement is not received, a level 2 announcement is not received, and a level 3 announcement is received.

14. The method of claim 8, further comprising waking the tag at a predetermined time before listening for an access portal beacon and entering a low power state after broadcasting a level 1 announcement.

15. The method of claim 8, further comprising:

determining whether the tag has data to transmit;

if the tag is identified as a level 1 tag, then sending the data to die access portal.

16. The method of claim 15, further comprising determining a charge level of a batter of the tag and if the tag's battery power is below a pre-determined threshold then choosing a data rate and modulation scheme that provides for reduced overall power drain.

17. A tag comprising:

a wireless communication module to listen for an access portal beacon;

a processor module coupled to the wireless communication module to identify the tag as a level 1 tag, if the access portal beacon is detected, and to record the level number as level 1, if the tag is identified as a level 1 tag; and an REID (Radio Frequency Identification) communication module coupled to the processor module to broadcast a level 1 announcement from the tag, if the tag is identified as a level 1 tag, and to listen for a broadcast of a level 1 announcement from a neighbor tag, if the tag is not identified as a level 1 tag.

18. The tag of claim 17, wherein the tag is further to determine whether the broadcast of a level 1 announcement from a neighbor tag has been received, and to identify the tag as a level 2 tag, if the access portal beacon is not received and a level 1 announcement is received.

19. The tag of claim 17, further comprising a battery to power the wireless communication module, the processor, arid the RFID communication module and wherein the processor is further to determine a charge level of the battery, determine the transmit power level required to transmit data to the access portal based on the strength of the received signal, compare the required transmit power level to the battery charge level, determine whether to identify the tag as a Level 1 tag based on the comparison.

20. The tag of claim 17, further comprising a positioning module coupled to the processor to determine the location of the tag.

* * * * *